W. W. BONFIELD.
APPARATUS FOR FEEDING SCALE PREVENTIVE INTO BOILERS.
APPLICATION FILED NOV. 3, 1915.
1,197,337.
Patented Sept. 5, 1916.
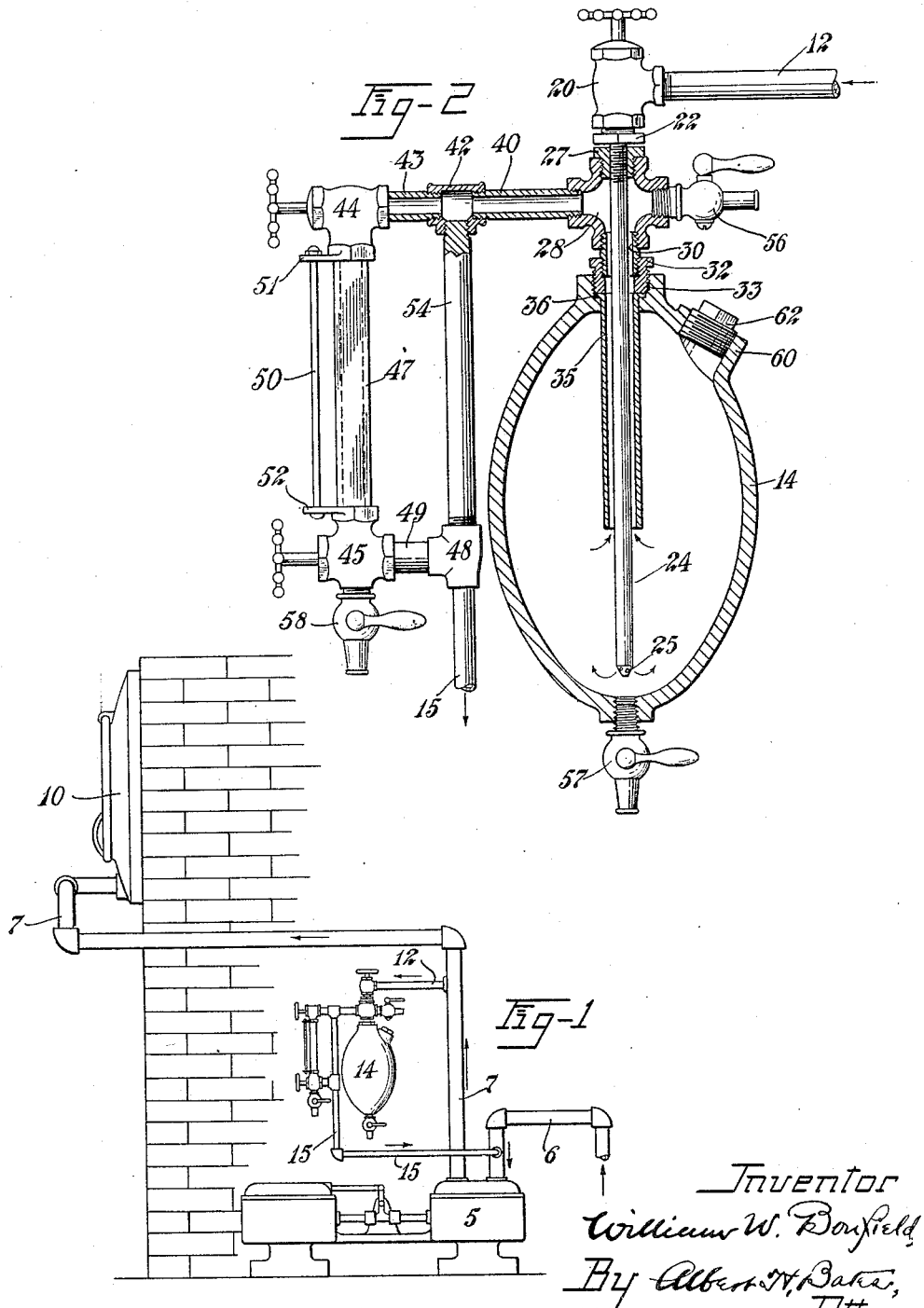

UNITED STATES PATENT OFFICE.

WILLIAM W. BONFIELD, OF CLEVELAND, OHIO, ASSIGNOR TO THE CONTRACTORS MACHINERY COMPANY, OF CLEVELAND, OHIO, A CORPORATION OF OHIO.

APPARATUS FOR FEEDING SCALE-PREVENTIVE INTO BOILERS.

1,197,337. Specification of Letters Patent. Patented Sept. 5, 1916.

Application filed November 3, 1915. Serial No. 59,417.

*To all whom it may concern:*

Be it known that I, WILLIAM W. BONFIELD, a citizen of the United States, residing at Cleveland, in the county of Cuyahoga and State of Ohio, have invented a certain new and useful Improvement in Apparatus for Feeding Scale - Preventive into Boilers, of which the following is a full, clear, and exact description, reference being had to the accompanying drawings.

This invention is for an apparatus for feeding scale preventive into boilers while in operation, and has for its general object the provision of a device by which scale preventive may be continuously forced into the boiler against pressure within the same.

It has heretofore been a common practice to put scale preventive into boilers at times when they are not in operation; another method has been to mix such preventive with water in a suitable receptacle and force the same quickly into the boilers at separate intervals, this operation being repeated periodically. It has been found, however, that these methods do not produce the best results. With my apparatus scale preventive may be fed to the boiler continuously during the operation of the water feeding means.

Another object of this invention is to continuously feed a powdered scale preventive to boilers without the usual inefficient mixing of the powder with the water and the incidental clogging of passages. This I accomplish by providing in my device a mixing chamber having inlet and outlet passages for the water so arranged as to secure the most efficient mixture, and to further insure against clogging of the passages, the opening of the outlet passage is located at a point where the mixture within the reservoir is most perfect.

A more specific object is to provide means whereby the feeding of the preventive may be accurately regulated.

My invention is hereinafter more fully described in connection with the accompanying drawings and the essential characteristics set out in the claims.

In the drawings Figure 1 is a diagrammatic view showing the arrangement of my device connected with a usual water feeding apparatus; Fig. 2 is an enlarged view of the device and the adjacent connections, some of the parts being sectioned for clearness of illustration.

Referring to the drawings by reference numerals, 5 indicates a suitable pump for feeding water to a boiler, shown as having an intake pipe 6 and a discharge pipe 7 leading to a boiler indicated at 10. A comparatively small pipe 12 connected with the discharge pipe 7 communicates through peculiarly arranged passages, hereinafter described, with the interior of a reservoir 14 adapted to contain the powdered scale preventive, which is therein mixed with water and discharged therefrom through other connections leading to a pipe 15 connected with the intake pipe 6. Accordingly, whenever the pump is in operation, superior pressure in the pipe 7 causes a continuous circulation of water through the pipe 12, the reservoir 14 and through the pipe 15 to the intake pipe 6. The water discharged from the reservoir 14 carries with it a portion of the scale preventive, which is mixed with water flowing to the pump and conveyed through the discharge pipe 7 to the boiler, where it may serve its intended purpose.

The novel construction of the reservoir and the arrangement of the intake and discharge passages by which the compound is efficiently mixed with the water, will now be described.

The pipe 12 leads to a valve 20, preferably of the needle valve type. Threaded into the other connection of this valve body is a plug or reducing bushing 22, which is in turn threaded onto the upper end of a tube 24 extending downwardly nearly to the bottom of the ovoid-shaped reservoir 14. This tube is provided at its lower end with discharge openings 25 from which the incoming water is discharged, as indicated by the arrows, into the interior of this reservoir. As shown, the upper end of the tube 24 is threaded through a reducing bushing 27 having its external threads engaging the upward opening of a four-way connection 28. At the opposite side this member receives one end of a short threaded nipple 30, which has its other end engaging the internal threads of a collar 32, which in turn has external threads 33 engaging threads in an opening in the upper end of the reservoir 14. Below the threaded portion this opening is contracted to receive the exterior of a tube 35 having its upper end flanged outwardly at 36 and engaging the shoulder above the contracted portion and held in this position by the collar 32, which presses this flange against the shoulder. This tube depends into the reservoir and is arranged concentrically about the tube 24 and terminates below the central portion of the reservoir; thus an outward passage for the liquid within the reservoir is provided around the outside of the tube 34 and within the tube 35. Fluid enters this latter tube as indicated by the arrows. At right angles to the axis of the tubes 24 and 35 is a short pipe 40 threaded into the member 28 and into one side of a T connection 42, which in turn receives one end of a similar pipe 43 leading to a globe valve 44 of a type similar to the valve 20, heretofore mentioned. Leading from the valve 44 to a second globe valve 45, is a sight glass 47. This valve is in turn connected with a T 48 by a short tube 49. One opening of the T 48 receives the upper end of the pipe 15 leading to the intake pipe 6, as heretofore described. The sight glass 47 has one end firmly mounted in each of the valves 44 and 45 and is protected on one side by vertical rods 50, shown as mounted in suitable ears 51 and 52, integral with the valve bodies 44 and 45 respectively. To prevent any strains on the connections leading to or from the sight glass breaking this glass, the T's 42 and 48 are connected by a solid brace rod 54, threaded into each of them in the manner shown. Thus the sight glass is protected on each side by the rods 50 and 54. The rod 54 serves to take any strains on the pipe connections, thereby preventing the glass being broken. A relief cock 56 is shown as threaded into the opening in the member 28, opposite the tube 40, and a similar cock 57 is provided at the lower end of the reservoir 14 for draining the same. Still another similar cock 58 is threaded into an opening in the valve body 45, to provide for draining the sight glass and associated parts. At one side of the upper portion of the reservoir 14 is provided an upwardly extending boss 60 having a threaded opening therethrough leading to the interior of the reservoir and adapted to be closed by a suitable threaded plug 62. This plug is preferably of such a size that when removed the reservoir may be readily filled, through this opening, with the scale preventive.

In the operation of my device the plug 62 is removed and a suitable amount of powdered graphite or other scale preventive is put into the reservoir. The vent cock 56 is opened and the valve 20 is opened allowing water to enter the reservoir through the tubes 12 and 24. This water passes outwardly through the small openings 25 at the lower portion of the body of powdered scale preventive, thereby thoroughly agitating the same and mixing with it. The vent cock 56 is left open until the reservoir is filled, thereby allowing air to escape, and is then closed, causing the pressure of water within the reservoir to rise. The valves 44 and 45 are now opened (being preferably closed during the filling process), and the pressure of water in the discharge pipe 7 causes water to flow through the device toward the intake pipe 6, where the pressure is relatively low. The course of the water through the device from the discharge pipe 7 to the intake pipe 6 is as follows: The water passes first through the pipe 12, through the valve 20, tube 24 and openings 25, as described, thoroughly mixing the scale preventive powder with the water, and this mixture enters the open lower end of the tube 35 and is forced upwardly within this tube around the outside of the tube 24, through the collar 32 and nipple 30, to the member 28. From this point the graphite mixture flows along the tubes 40 and 43, through the valve 44 and downwardly through the sight glass 47, through the valve 45, tube 49 and pipe 15, to the intake pipe 6. The amount of water passing to the reservoir may be accurately controlled by the valve 20 and the scale preventive mixture passing from the reservoir may be controlled by either or both of the valves 44 and 45. Accordingly, by regulating these valves, an exact amount of scale preventive may be continuously fed to the boiler during the operation of the pump 5.

By regulating the valve 45 with relation to the amount of water fed to the reservoir, the passage of mixture through the sight glass 47 may be made relatively free, whereby pulsations of the pump may so agitate the water passing downwardly through the sight glass as to prevent the scale preventive powder from adhering to the glass and thereby coating its interior surface and rendering it useless. Ordinarily if a naturally adhesive substance such as graphite powder is used as a scale preventive, it quickly coats the interior of any passage through which it may be led, and, in fact, it is this property that renders it so valuable as a scale preventive when it reaches the boiler tubes. I have found in actual practice that my sight glass does not become coated with graphite powder and it seems that the reason is due to the agitation of the water, as above mentioned, and the fact that it passes downwardly through the tube, in addition to the thoroughness with which the preventive is mixed with the water.

It will be further noted that the construction of the connections leading to and from the reservoir, and particularly the tubes 24 and 35, is such that they are not only simple and cheap to manufacture, but the open end of the tube 35 is so positioned with relation to the body of the mixture within the reservoir that the discharge from the reservoir occurs at a point where the mixture within the same is most perfect. In mixing the powdered scale preventive with water there is unavoidably some portion of the powder that remains afloat for a considerable time. The arrangement of the inlet openings 25, however, effectively prevents the graphite from adhering to the bottom and side walls of the reservoir, and as the discharge opening is always materially below the upper surface or floating body of the preventive, such comparatively dry and adhesive powder is not allowed to enter the passages leading from the reservoir. Accordingly, the usual clogging of tubes is avoided by my construction.

Having thus described my invention what I claim is:

1. In an apparatus of the character described, the combination of a reservoir adapted to contain powdered scale preventive and having an opening at the top, an intake tube depending through said opening and extending to a point adjacent the bottom of the reservoir, a tube depending from said opening around the intake tube forming the outlet passage and terminating intermediate the top and bottom of the reservoir, and a connection between the outlet passage and the boiler.

2. In an apparatus of the character described, the combination of a reservoir for a powdered scale preventive having a deeply dished bottom and an opening, an intake tube extending through said opening to a point adjacent the bottom of the reservoir, means at the bottom of the tube for causing fluid to leave the same in various directions, a tube carried in said opening and depending around the intake tube having its inside diameter larger than the outside of the intake tube and forming the outlet passage, a connection between the outlet passage and the boiler, and means for forcing liquid through the intake pipe.

3. In an apparatus of the character described, the combination of a reservoir having a deeply dished bottom, an opening at the top, an intake tube extending downwardly through said opening to a point adjacent the bottom of the reservoir, a larger concentric tube depending around the intake tube and forming the outlet passage, tubular connections extending upwardly from the reservoir around the intake tube and then laterally, and connections leading to the boiler communicating with the upwardly extending passage, the reservoir having a filling opening adjacent the top thereof, a closure for said filling opening, and means for forcing liquid through the intake pipe.

4. In an apparatus of the character described, the combination of a reservoir having an opening at the top, an intake tube extending through said opening to a point adjacent the bottom of the reservoir, an outlet tube surrounding the intake tube and having its inside diameter of sufficient size to provide a passage around the intake tube and within the outlet tube, said outlet tube having an outwardly extending flange, a shoulder formed in said opening, a threaded collar adapted to clamp the flange against said shoulder, means for forcing the water through the intake tube, and connections leading from the outlet tube to the boiler.

5. In an apparatus of the character described, the combination of an ovoid-shaped reservoir adapted to contain powdered scale preventive, said reservoir having an opening at the top, an intake tube extending outwardly through said opening to a point adjacent the bottom of the reservoir and adapted to spread the liquid against the bottom in various directions, an outlet tube having its upper end threaded in said opening and depending around the intake tube and being of sufficient diameter to provide a passage around the outside of the intake tube and terminating at a point below the middle of the reservoir, tubular connections extending upwardly from the top of the reservoir and surrounding the intake tube providing a passage around the same communicating with the passage formed by said outlet tube, means for forcing liquid through said intake tube into the reservoir, and connections between said outlet passage and the boiler.

In testimony whereof, I hereunto affix my signature.

WILLIAM W. BONFIELD.

Copies of this patent may be obtained for five cents each, by addressing the "Commissioner of Patents, Washington, D. C."